Dec. 23, 1924.

R. STAHL 1,520,314

CLUTCH

Filed Aug. 14, 1922    2 Sheets-Sheet 1

Inventor
Rodolphe Stahl.
By Ralzemond A. Parker
Attorney

Dec. 23, 1924.  1,520,314

R. STAHL

CLUTCH

Filed Aug. 14, 1922   2 Sheets-Sheet 2

Inventor
Rodolphe Stahl.

By Ralzemond A. Parker
Attorney

Patented Dec. 23, 1924.

1,520,314

UNITED STATES PATENT OFFICE.

RODOLPHE STAHL, OF DETROIT, MICHIGAN.

CLUTCH.

Application filed August 14, 1922. Serial No. 581,626.

*To all whom it may concern:*

Be it known that I, RODOLPHE STAHL, a citizen of the United States, residing at Detroit, county of Wayne, State of Michigan, have invented a certain new and useful Improvement in Clutches, and declare the following to be a full, clear, and exact description of the same, such as will enable others skilled in the art to which it pertains to make and use the same, reference being had to the accompanying drawings, which form a part of this specification.

My invention relates to a clutch for an automobile. An object of my improvements is to provide an improved clutch which shall be compact in its assembled construction, of small weight in its constituent parts, and cheap to construct and convenient to assemble. I secure this object in the apparatus illustrated in the accompanying drawings, in which.

Figure 1:
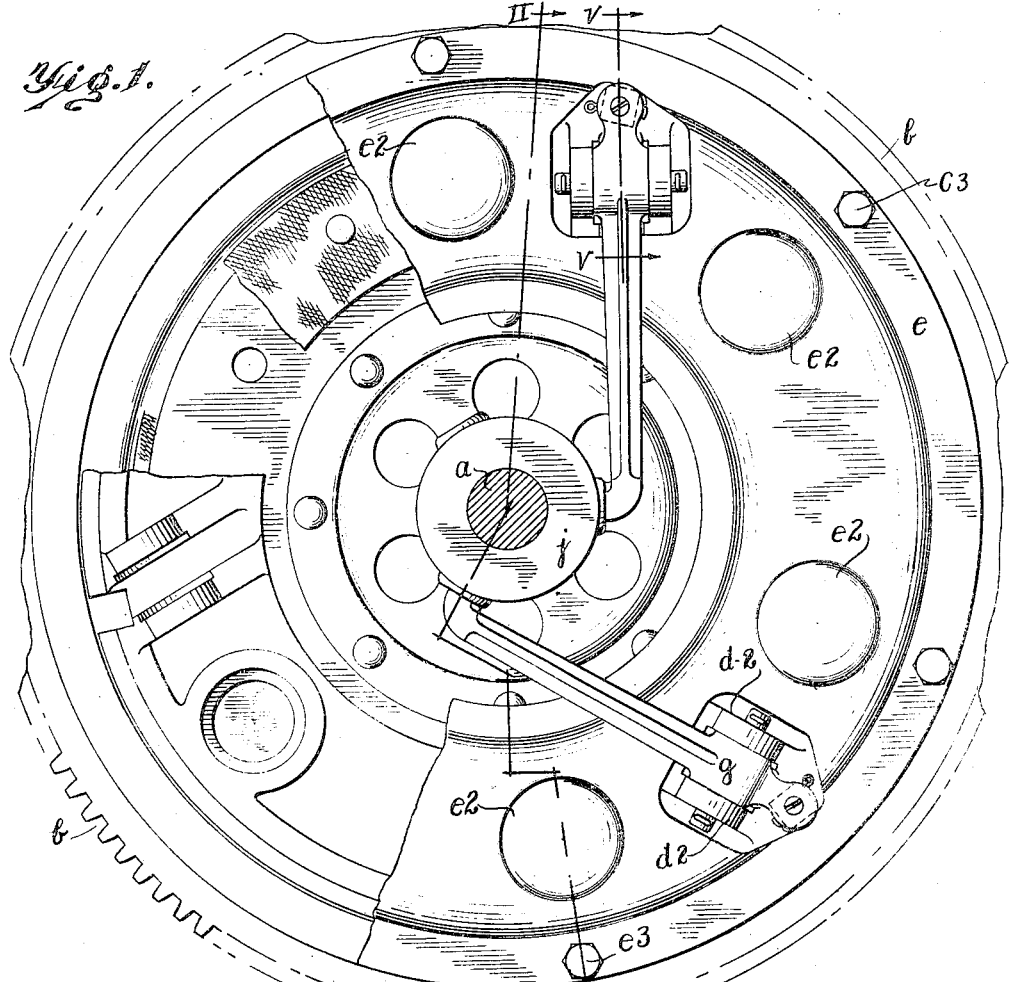
Figure 1 is an elevation of a clutch embodying my invention, partly broken away.
Figures 5, 6:
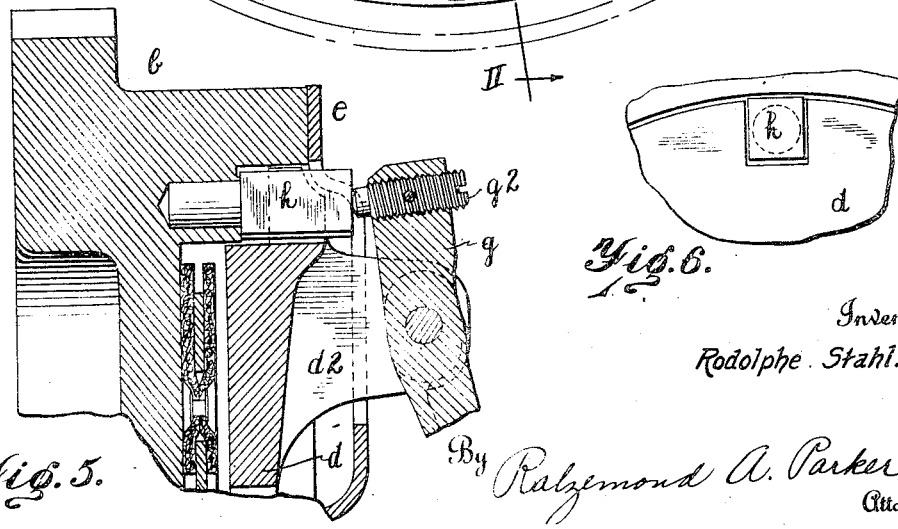
Fig. 5 is a detailed sectional view to an enlarged scale on the line V—V of Fig. 1.
Fig. 6 is a detailed elevation looking from the right of Fig. 5, the lever arm $g$ and the plate $e$ being removed.

$a$ is the shaft through which the power is conveyed to the transmission gearing and shaft. $b$ is the fly-wheel of the engine. The fly-wheel $b$ is made concave on its face remote from the engine and this concavity is bounded by two cylindrical walls concentric with the fly-wheel; the one $b^2$ of less diameter, being the inner one, bounds the flat frictional surface $b^5$; the outer one $b^3$, of greater diameter, bounds the shoulder $b^4$ in a plane parallel to the frictional surface $b^5$.

$a^2$ is an extension of shaft $a$ coaxial with the fly-wheel $b$ and extends into said concavity thereof and is provided with a bearing at the center of said fly-wheel.

$c$ is a plate provided with a hub $c^5$ surrounding the shaft $a$ which is keyed or splined to said shaft in such a manner as to allow it to reciprocate. The dish of said plate extends outwardly from said hub and is dished or made concaved on its side toward the web of the fly-wheel. The periphery of said plate again turns outwardly forming a flat annular surface in a plane parallel to the web of the fly-wheel and the frictional surface $b^5$ of said fly-wheel. $c^2$ is an annular steel plate secured by rivets $c^4$ to the flat surface at the periphery of the plate $c$ and extending outwardly adjacent and parallel to the friction surface $b^5$ on the web of the fly-wheel. $c^3$ indicates two textile or asbestos rings secured to the plate $c^2$ and forming friction linings upon opposite sides thereof.

$d$ is a pressure ring having an inner surface parallel and adjacent to the steel plate $c^2$. The ring $d$ has a peripheral cylindrical surface $d^4$ fitting within and corresponding to the cylindrical surface $b^2$ upon the fly-wheel and a second cylindrical peripheral surface $d^3$ of greater diameter fitting within and corresponding to the surface $b^3$ upon the fly-wheel. This forms an annular surface at the periphery of the plate $d$ corresponding and parallel to the surface $b^4$ upon the fly-wheel.

$e$ is a plate, annular in form, and of a diameter corresponding to that of the fly-wheel, secured to the surface of the fly-wheel at its periphery and extending inward therefrom and dished so that its concavity is toward that of the fly-wheel. The inner edge of the plate $e$ extends into the cavity in the fly-wheel $b$.

$d^2$ are lugs upon the pressure ring $d$ extending outwardly therefrom and through apertures in the plate $e$. $g$ indicates lever arms pivoted in the lugs $d^2$. $h$ indicate pins fitting into slots formed in the periphery of the ring $d$ and engaging in apertures formed for that purpose in the rim of the fly wheel. The outer ends of the pins $h$ are hardened and come directly in line with the outer ends of the lever arms $g$. $g^2$ indicate set screws, one of which passes transversely through the outer end of each of the lever arms $g$ and is provided with screw-threads engaging internal screw-threads in apertures in said arm. The set screws $g^2$ bear at their inner ends against the outer ends of the pins $h$.

$j$ is the usual slip ring adapted to reciprocate upon the shaft $a$ and and having a groove around its periphery engaged by a lever $k$ by which said ring can be reciprocated to oscillate the arms $g$.

Figures 2, 3, 4:
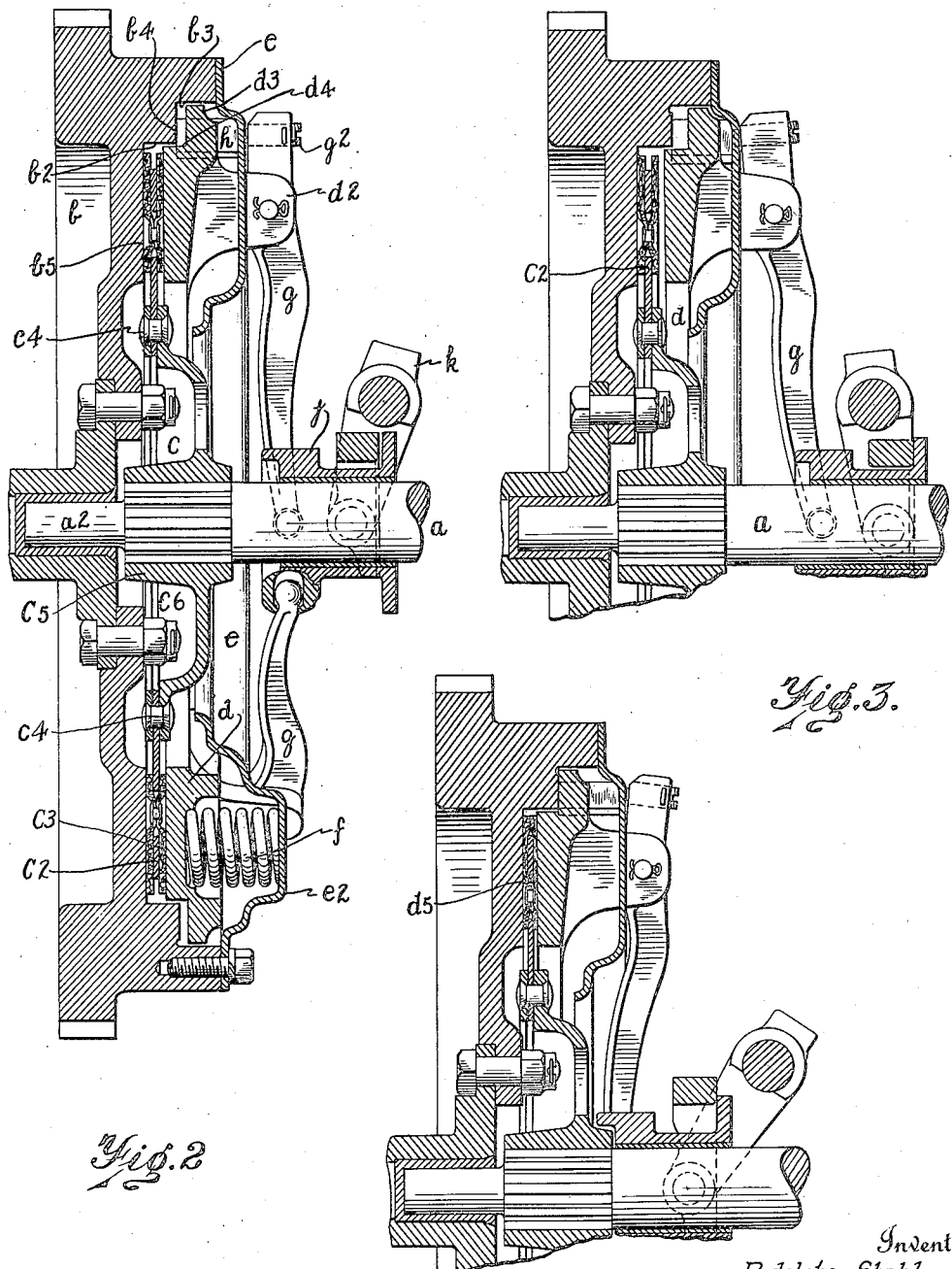
Fig. 2 is a section on the line II—II of Fig. 1.
Fig. 3 is a part-sectional view similar to Fig. 2 showing the parts in a disengaged position.
Fig. 4 is a view similar to Fig. 3 showing the parts in their engaged position.

$e^2$ indicates sockets pressed out of the ring $e$, closed at their outer ends and opening inward. There is in each of these sockets a pressure spring $f$, one end of which bears against the bottom of the socket $e^2$, and therefore the plate $e$ and the other end engages in a cavity provided therefor in the pressure ring $d$. The springs $f$ act to force the pressure ring $d$ inward and against the asbestos or textile lining $c^3$ of the steel plate $c^2$ so as to clamp said plate and its linings between the friction surface $b^5$ on the fly wheel and the inner surface of the pressure ring $d$, as shown in Fig. 4. This unites the fly wheel with the plate $c$ and consequently the shaft $a$ so that the power is conveyed from the engine through the fly wheel to said shaft.

By rocking the lever $k$ the ring $j$ is moved to the right along the shaft $a$, rocking the levers $g$, which draw outward on the lugs $d^2$ to draw the pressure ring $d$ out of engagement as shown in Fig. 3. Thus the steel plate $c^2$ is released and the connection is broken between the engine and the shaft $a$.

The dished form of the plate $e$ affords clearance room for the assembling bolts of the fly wheel and brings the annular plate $c^2$ well within the cavity of the fly wheel, the construction also permitting the pressure ring $d$ to engage within the cavity of the fly wheel.

The plate $e$ is easily and cheaply stamped and formed and when assembled in position presents a firm support for the springs $f$. Said plate also forms, in part, an enclosing casing for the parts within the cavity of the fly wheel and toward the periphery thereof.

The combined construction is compact, especially in an axial direction, and affords a strong and durable construction which is cheap to make and assemble and is permanent and efficient in its operation.

What I claim is:

1. The combination of a fly wheel, a ring $c$, a pressure ring adapted to clamp the ring $c$ against said fly wheel, said pressure ring having apertures through its periphery, pins fixed to said fly wheel and extending through said apertures, a plate $e$ fixed to said fly wheel and extending over said pressure ring provided with apertures, said pins extending through said apertures, lugs extending from the said pressure ring through apertures in the plate $e$, levers pivoted to the outer ends of said lugs and bearing against said pins.

2. The combination of a fly wheel having a concavity in its face, a transmission shaft extending into said concavity coaxial with said fly wheel, a disk having a hub secured to the end of said transmission shaft, said disk having a flange toward its periphery turning inward to form a dished construction, said disk being provided with a plate extending outward from its periphery, a pressure ring within the concavity of said fly wheel adapted to engage said plate, said ring being provided with notches in its periphery, and pins passing through and engaging in said notches and fixed to said fly wheel at their inner ends, lugs extending outwardly from said ring, and levers pivoted in said lugs and engaging said pins at their outer ends.

3. The combination of a fly wheel having a concavity in its face, a transmission shaft extending into said concavity coaxial with said fly wheel, a disk having a hub secured to the end of said transmission shaft, said disk having a flange toward its periphery turning inward to form a dished construction, said disk being provided with a plate extending outward from its periphery, and a pressure ring within the concavity of said fly wheel adapted to engage said plate, said ring being provided with notches in its periphery, and pins passing through and engaging in said notches and fixed to said fly wheel at their inner ends, an annular plate secured to the face of said fly wheel around its periphery and extending over said concavity, said ring being provided with apertures, said pins extending through said apertures, and springs interposed between said pressure ring and said annular plate.

4. The combination of a fly wheel having a concavity in its face, a transmission shaft extending into said concavity coaxial with said fly wheel, a disk having a hub secured to the end of said transmission shaft, said disk having a flange toward its periphery turning inward to form a dished construction, said disk being provided with a plate extending outward from its periphery, and a pressure ring within the concavity of said fly wheel adapted to engage said plate, said ring being provided with notches in its periphery, and pins passing through and engaging in said notches and fixed to said fly wheel at their inner ends, an annular plate secured to the face of said fly wheel around its periphery and extending over said cavity, said ring being provided with apertures, said pins extending through said apertures, and springs interposed between said pressure ring and said annular plate, said annular plate being pressed outward to form sockets in which the ends of said springs engage.

In testimony whereof, I sign this specification.

RODOLPHE STAHL.